United States Patent
Taki

(10) Patent No.: US 10,286,738 B2
(45) Date of Patent: May 14, 2019

(54) TIRE PRESSURE DETECTOR

(71) Applicant: TOYOTA JIDOSHA KABUSHIKI KAISHA, Toyota-shi, Aichi-ken (JP)

(72) Inventor: Yuji Taki, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 114 days.

(21) Appl. No.: 15/469,917

(22) Filed: Mar. 27, 2017

(65) Prior Publication Data

US 2017/0305213 A1 Oct. 26, 2017

(30) Foreign Application Priority Data

Apr. 22, 2016 (JP) .................. 2016-085981

(51) Int. Cl.
*B60C 23/04* (2006.01)

(52) U.S. Cl.
CPC ...... *B60C 23/0474* (2013.01); *B60C 23/0476* (2013.01); *B60C 23/0483* (2013.01); *B60C 23/0403* (2013.01)

(58) Field of Classification Search
CPC ............ B60C 23/0474; B60C 23/0476; B60C 23/0483; B60C 23/0403
USPC .. 73/146, 146.2, 146.3, 146.4, 146.5, 146.8; 702/98–99, 138; 340/870.02–870.03, 340/442–449
See application file for complete search history.

(56) References Cited

U.S. PATENT DOCUMENTS

| | | | | |
|---|---|---|---|---|
| 4,893,110 A | * | 1/1990 | Hebert | B60C 23/0408 340/442 |
| 2007/0073503 A1 | * | 3/2007 | Hafele | B60C 23/0408 702/98 |
| 2012/0176233 A1 | * | 7/2012 | Petrucelli | B60C 23/0401 340/447 |

FOREIGN PATENT DOCUMENTS

| | | |
|---|---|---|
| CN | 1675079 A | 9/2005 |
| JP | 2003-246211 A | 9/2003 |
| JP | 2005-008109 A | 1/2005 |
| JP | 2005-138684 A | 5/2005 |
| JP | 2006-327554 A | 12/2006 |
| WO | 2004/016455 A2 | 2/2004 |

\* cited by examiner

*Primary Examiner* — Daniel S Larkin
*Assistant Examiner* — Anthony W Megna Fuentes
(74) *Attorney, Agent, or Firm* — Oliff PLC

(57) ABSTRACT

A tire pressure detector includes: an air pressure detector to repeatedly detect air pressure of a target tire; a transmission device to wirelessly transmit air pressure information about the air pressure detected by the air pressure detector; a reception device to receive the air pressure information transmitted by the transmission device; an estimation device to calculate, when the reception device receives the air pressure information on the identical target tire a plurality of times, an estimated air pressure based on a plurality of pieces of the latest air pressure information received by the reception device, the estimated air pressure being an estimated value of the air pressure at current time; and an alarm generation device to raise an alarm when the estimated air pressure becomes equal to or less than a specified threshold.

3 Claims, 8 Drawing Sheets

TIRE PRESSURE DETECTOR

INCORPORATION BY REFERENCE

The disclosure of Japanese Patent Application No. 2016-085981 filed on Apr. 22, 2016 including the specification, drawings and abstract is incorporated herein by reference in its entirety.

BACKGROUND

1. Field of the Disclosure

The present disclosure relates to a tire pressure detector that informs a vehicle occupant of a decreased air pressure of a wheel tire.

2. Description of Related Art

When air leaks from a tire of each wheel of a vehicle, the air pressure of the tire becomes lower than a specified reference value, which leads to deteriorated drivability of the vehicle. Accordingly, some vehicles are equipped with a tire pressure detector capable of informing a vehicle occupant that the air pressure of the tire of any one wheel is lower than the reference value.

The tire pressure detector of this type includes air pressure detection means for repeatedly detecting the air pressure of the tire of each wheel every predetermined time. Furthermore, each wheel is equipped with transmission means for wirelessly transmitting the detected air pressure every predetermined time.

The tire pressure detector further includes reception means provided in a vehicle body. The reception means receives information about the air pressure transmitted from the transmission means of each wheel.

The tire pressure detector further includes alarm generation means provided in the vehicle body. The alarm generation means raises an alarm when the air pressure that the reception means received becomes equal to or less than a specified reference value (threshold). Accordingly, when an alarm is raised, the vehicle occupant can recognize that the air pressure of the tire of any one of the wheels is lower than the reference value.

SUMMARY

When a vehicle travels, each of the wheels rotates, with the transmission means rotating together with the wheels. That is, when the vehicle travels, a relative position of each of the transmission means and the reception means changes every moment. The relative position of each of the transmission means and the reception means influences communication performance between each of the transmission means and the reception means. In other words, when a given one transmission means and the reception means have a specified relative position relationship, the transmission means and the reception means demonstrate good communication performance. On the contrary, when the transmission means and the reception means have another relative position relationship, the communication performance between the transmission means and the reception means may be deteriorated.

Moreover, various component parts that constitute a vehicle are located between each of the wheels and the reception means. Accordingly, irrespective of the rotational position of the wheels, these component parts may disturb wireless communication between the transmission means and the reception means. As a result, the communication performance between the transmission means and the reception means may be deteriorated.

Furthermore, the vehicle incorporates various electronic devices. Accordingly, due to the influence of electromagnetic noise generated from the electronic devices, the communication performance between each of the transmission means and the reception means may be deteriorated.

Thus, the transmission means provided in each wheel and the reception means may fail to demonstrate expected communication performance in some cases. That is, when the transmission means provided in a given wheel wirelessly transmits the information about the air pressure of the tire with certain timing, the reception means may fail to receive the information.

Accordingly, there is a possibility, for example, that the reception means may continuously fail to receive the information about the air pressure, which was wirelessly transmitted by the transmission means provided in one given wheel, over a plurality of times. When such a situation occurs, the occupant is kept oblivious to the fact that the air pressure of the tire of the wheel is lower than the reference value over a long time.

If the time intervals of detection operation by the air pressure detection means and the time intervals of the wireless transmission operation by the transmission means are shortened, the number of times that the reception means can receive information in a definite period of time is theoretically increased. In other words, even when the reception means is unable to demonstrate expected communication performance, the possibility that the reception means can receive the information in a definite period of time is increased. Therefore, shortening these intervals can solve the problem to some extent.

However, the air pressure detection means and the transmission means are electronic devices that operate using electric power of a power supply. As the power supply, a small battery provided in each wheel is generally used. Accordingly, in this case, the battery has a short life and therefore needs frequent replacement.

The present disclosure provides a vehicle tire pressure detector including transmission means provided in a wheel for wirelessly transmitting at least information about the air pressure of a tire and reception means provided in a vehicle body, the detector being capable of informing an occupant of a decreased air pressure of the tire in a short time after the decrease or in advance even when the transmission means and the reception means are unable to demonstrate expected communication performance, the detector also being capable of reducing power consumption when the air pressure detection means and the transmission means are constituted from electronic devices.

A first aspect of the present disclosure is a tire pressure detector, including: an air pressure detector provided in a target tire, the air pressure detector being configured to repeatedly detect air pressure of the target tire; a transmission device provided in the target tire, the transmission device being configured to wirelessly transmit air pressure information about the air pressure detected by the air pressure detector; a reception device provided in a vehicle body, the reception device being configured to receive the air pressure information transmitted by the transmission device; an estimation device provided in the vehicle body, the estimation device being configured to calculate, when the reception device receives the air pressure information on the identical target tire a plurality of times, an estimated air pressure based on a plurality of pieces of latest air pressure information received by the reception device, the estimated air pressure being an estimated value of the air pressure at current time; and an alarm generation device provided in the vehicle body, the alarm generation device being configured to raise an alarm when the estimated air pressure becomes equal to or less than a specified threshold.

According to the aspect, even when the transmission device and the reception device are unable to demonstrate expected communication performance, it becomes possible to inform the occupant that the air pressure of the tire is equal to or less than the threshold in a short time after the air pressure of the tire becomes equal to or less than the threshold or in advance.

Even when the transmission device and the reception device are unable to demonstrate expected communication performance, it becomes possible to inform the occupant of a decreased air pressure of the tire irrespective of the length of operation intervals of the air pressure detector and the transmission device. Accordingly, it becomes possible to eliminate the necessity of shortening the operation intervals of the air pressure detector and the transmission device. As a consequence, when the air pressure detector and the transmission device are constituted from electronic devices, it becomes possible to reduce power consumption by these electronic devices.

A second aspect of the present disclosure is a tire pressure detector, including: an air pressure detector provided in a target tire, the air pressure detector being configured to repeatedly detect air pressure of the target tire; a temperature detector provided in the target tire, the temperature detector being configured to repeatedly detect temperature of air inside the target tire with timing identical to timing of detection of the air pressure by the air pressure detector; a transmission device provided in the target tire, the transmission device being configured to wirelessly transmit air pressure information about the air pressure and temperature information about the temperature that are detected with identical timing by the air pressure detector and the temperature detector; a reception device provided in a vehicle body, the reception device being configured to receive the air pressure information and the temperature information transmitted by the transmission device; an arithmetic device provided in the vehicle body, the arithmetic device being configured to calculate a temperature correction pressure value obtained by dividing an air pressure value by a temperature value, the air pressure value being recorded on the air pressure information received by the reception device, the temperature value being recorded on the temperature information received by the reception device with timing identical to reception timing of the air pressure information; an estimation device provided in the vehicle body, the estimation device being configured to calculate, when the reception device receives the air pressure information and the temperature information on the identical target tire from the transmission device a plurality of times, an estimated temperature correction pressure value based on the plurality of pieces of latest temperature correction pressure value, the estimated temperature correction pressure value being an estimated value of the temperature correction pressure value at current time; and an alarm generation device provided in the vehicle body, the alarm generation device being configured to raise an alarm when the estimated temperature correction pressure value becomes equal to or less than a specified first threshold, or when a value becomes equal to or less than a specified second threshold, the value being obtained by multiplying the estimated temperature correction pressure value by a temperature value recorded on the temperature information that is received by the reception device and is latest based on current time.

According to the aspect, it becomes possible to accurately determine whether or not the air pressure of the tire decreases in the case where, for example, the temperature of the tire considerably changes due to the tire being dipped into a puddle.

In the aspect, the estimation device may be configured to calculate R that is the estimated air pressure at current time t based on Expression below: $R=(R2-R1)/(t2-t1)\times(t-t2)+R2$ where t1, t2 may represent in chronological order respective times when the reception device received latest two pieces of the air pressure information, t may represent the current time, R1 may represent the air pressure at time t1, and R2 may represent the air pressure at time t2.

In the aspect, the estimation device may be configured to calculate R that is the estimated temperature correction pressure value at current time t based on Expression below: $R=(R2-R1)/(t2-t1)\times(t-t2)+R2$ where t1, t2 may represent in chronological order respective times when the latest two temperature correction pressure values were calculated, t may represent the current time, R1 may represent the temperature correction pressure value at time t1, and R2 may represent the temperature correction pressure value at time t2.

According to the aspect, when the estimation means calculates the estimated air pressure or the estimated temperature correction pressure value based on latest two air pressures or temperature correction pressure values, the start time of calculating these values is moved up. Therefore, the vehicle tire pressure detector can inform the occupant of a decrease in the air pressure of the tire at earlier time.

BRIEF DESCRIPTION OF THE DRAWINGS

Features, advantages, and technical and industrial significance of exemplary embodiments of the disclosure will be described below with reference to the accompanying DRAWINGS, in which like numerals denote like elements, and wherein.

DETAILED DESCRIPTION OF EMBODIMENTS

Hereinafter, a description is given of a vehicle tire pressure detector according to the first embodiment of the present disclosure with reference to FIGS. 1 through 5.

Figure 1:
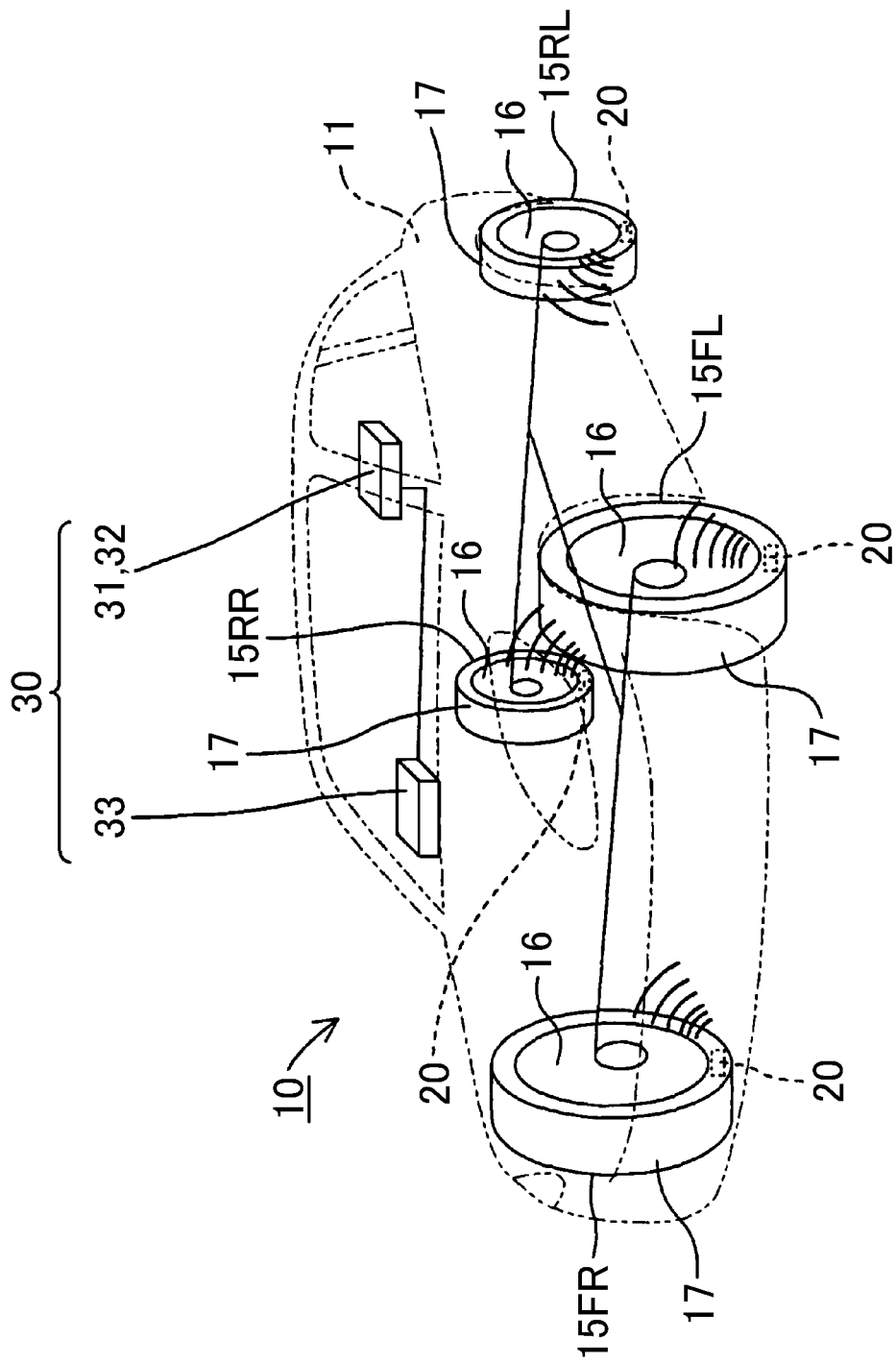
FIG. 1 illustrates a vehicle including a vehicle tire pressure detector according to a first embodiment of the present disclosure.

As illustrated in FIG. 1, a vehicle 10, to which the tire pressure detector according to the present embodiment is applied, includes a vehicle body 11, and four wheels each rotatable with respect to the vehicle body 11. The four wheels are a left-side front wheel 15FL, a right-side front wheel 15FR, a left-side rear wheel 15RL, and a right-side rear wheel 15RR, respectively. As is well known, the front wheels 15FL, 15FR and the rear wheel 15RL, 15RR each include a wheel 16 rotatably supported by a carrier (illustration omitted) that is a component part on the side of the vehicle body 11, and a tire 17 fixed to an outer periphery of the wheel 16. Each tire 17 is a hollow and annular member made of an elastic material. The interior space of the tire 17 is filled with air.

The vehicle tire pressure detector of the present embodiment includes four measurement units 20 and one warning determination unit 30.

Figure 2:
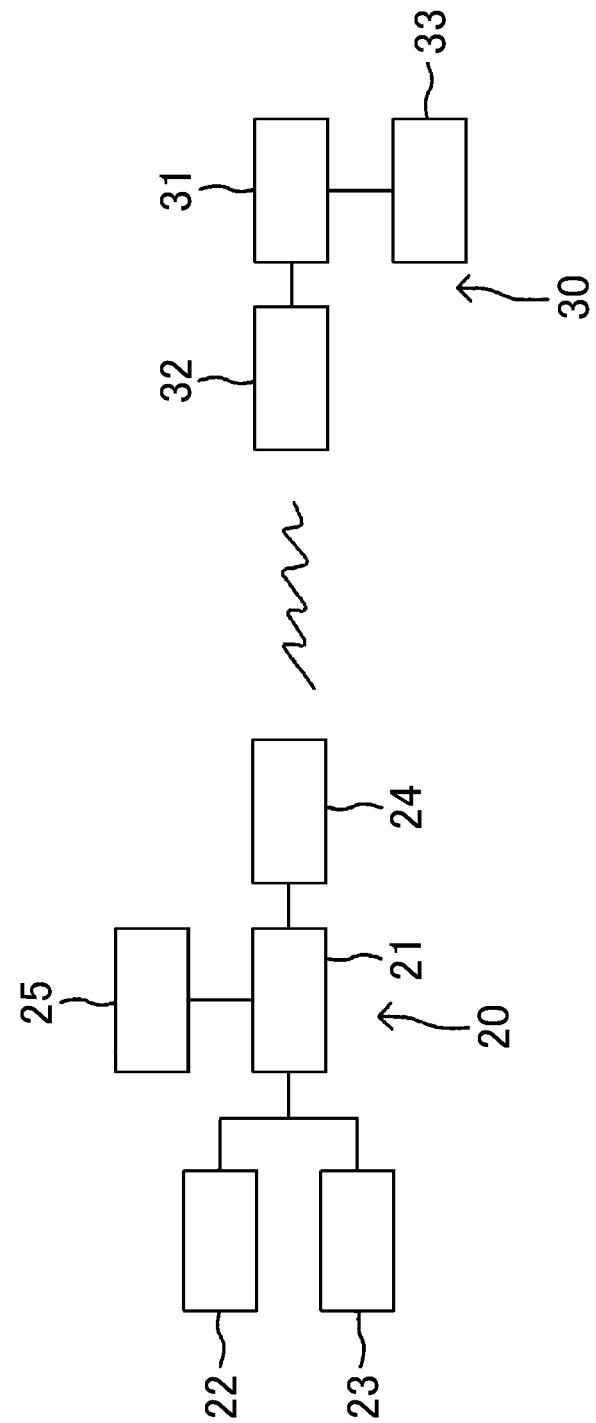
FIG. 2 is a block diagram illustrating a relationship among main component parts of the vehicle tire pressure detector.

As illustrated in FIG. 1, the measurement unit 20 is provided in each of the front wheels 15FL, 15FR and the rear wheels 15RL, 15RR. As illustrated in FIG. 2, the measurement unit 20 includes a tire-side ECU 21, a pneumatic sensor 22, a temperature sensor 23, transmission means 24, and a battery 25. The pneumatic sensor 22, the temperature sensor 23, the transmission means 24, and the battery 25 are connected to the tire-side ECU 21.

The tire-side ECU 21, the pneumatic sensor 22, the temperature sensor 23, and the transmission means 24 are each an electronic device and operate with the electric power supplied from the battery 25. The battery 25 constantly supplies electric power to the tire-side ECU 21, the pneumatic sensor 22, the temperature sensor 23, and the transmission means 24 until the capacity of the battery 25 becomes zero. Furthermore, operation of the pneumatic sensor 22, the temperature sensor 23, and the transmission means 24 is controlled by the tire-side ECU 21. The term ECU is an abbreviation for electric control unit, which is an electronic control circuit having a microcomputer as a main component part, the microcomputer including a CPU, a ROM, a RAM, and an interface. The CPU implements later-described various functions by executing instructions stored in a memory (ROM).

The pneumatic sensor 22 measures air pressure P of the interior space of the tire 17. The temperature sensor 23 measures temperature T of air in the interior space of the tire 17. The pneumatic sensor 22 and the temperature sensor 23, which are provided in the same wheel, each repeatedly measure the air pressure P and the temperature T at every predetermined time (for example, once per minute) with identical timing. The pneumatic sensor 22 and the temperature sensor 23 repeatedly transmit own results of measurement to the tire-side ECU 21 at every predetermined time (for example, once per minute) with identical timing.

The transmission means 24 repeatedly transmits the respective detection results, which are detected with identical timing by the pneumatic sensor 22 and the temperature sensor 23 provided in the identical wheel, as a pair at every predetermined time (for example, once per minute) in a wireless manner. Together with the detection results, the transmission means 24 also repeatedly transmits an identifying signal (ID) that can identify the transmission means 24 in a wireless manner.

As illustrated in FIGS. 1 and 2, the vehicle body 11 is equipped with one warning determination unit 30. The warning determination unit 30 includes a body-side ECU 31, reception means 32, and display means 33. Each of the body-side ECU 31, the reception means 32, and the display means 33 is an electronic device and operates with the electric power supplied from an in-vehicle battery (illustration omitted) provided in the vehicle body 11. Furthermore, operation of the reception means 32 and the display means 33 is controlled by the body-side ECU 31. The body-side ECU 31 is also an electronic control circuit having a microcomputer as a main component part, the microcomputer including a CPU, a ROM, a RAM, and an interface.

The reception means 32 constantly maintains a wireless transmission receivable state while electric power is supplied, and repeatedly receives wireless transmission from the transmission means 24 of each measurement unit 20 provided in each of the front wheel 15FL, 15FR and the rear wheel 15RL, 15RR. In other words, the reception means 32 repeatedly receives the information about the air pressure P and the temperature T of each tire 17 sent by the transmission means 24 of each measurement unit 20 together with the ID of the transmission means 24. Furthermore, upon reception of the wireless transmission from the transmission means 24, the reception means 32 transmits to the body-side ECU 31 the received information about the air pressure P, the temperature T, and the ID as one set.

Whenever acquiring the information about the air pressure P, the temperature T, and the ID of each tire 17 from the reception means 32, the body-side ECU 31 records the receipt time, the air pressure P, the temperature T, and the ID on the RAM. Whenever acquiring the information about the air pressure P of each tire 17 from the reception means 32, the body-side ECU 31 repeatedly determines whether or not the acquired air pressure P is equal to or less than a specified threshold Th (reference value) stored in its own memory.

The display means 33 is a liquid crystal display provided in an instrument panel (illustration omitted) of the vehicle body 11. The display means 33 is provided with four display areas corresponding to each of the front wheels 15FL, 15FR and the rear wheels 15RL, 15RR. When determining that "the air pressure P of the tire 17 is equal to or less than the threshold Th" based on the information wirelessly transmitted from the measurement unit 20 of any one of the front wheels 15FL, 15FR and the rear wheels 15RL, 15RR, the body-side ECU 31 identifies, based on the ID of the transmission means 24, a display area of the display means 33 corresponding to the wheel equipped with the pertinent measurement unit 20. The body-side ECU 31 then displays a warning on the identified display area over predetermined time. For example, warning display is executed by blinking the display area in red. As a result, an occupant of the vehicle 10 can recognize that the air pressure P is decreased due to air leaking from the tire 17.

As described before, it is not ensured that the reception means 32 of the warning determination unit 30 can receive every wireless transmission from the transmission means 24 of each measurement unit 20 provided in each of the front wheels 15FL, 15FR and the rear wheels 15RL, 15RR. When the vehicle 10 is traveling in particular, the possibility that the reception means 32 can receive all the wireless information transmitted from each transmission means 24 is low. Therefore, the reception means 32 may become unable to receive the wireless information transmitted from the transmission means 24, while the air pressure P of the interior space of the tire 17 becomes equal to or less than the threshold Th. As a result, the display means 33 may fail to display the warning that should originally be displayed by the display means 33. In other words, the display means 33 may be unable to inform the occupant of the vehicle 10 that the air pressure P is equal to or less than the threshold Th due to air leaking from the tire 17 of any one of the front wheels 15FL, 15FR and the rear wheels 15RL, 15RR. To cope with the situation, the body-side ECU 31 not only compares an actual air pressure P of the tire 17 with the threshold Th, but also executes the following processing.

That is, whenever acquiring the information about the air pressure P and the temperature T of each tire 17 from the reception means 32, the body-side ECU 31 repeatedly calculates a temperature correction pressure value. The temperature correction pressure value is a correction value of the air pressure P obtained by dividing the acquired air pressure P by the temperature T acquired concurrently with the air pressure P (i.e., dividing the air pressure P received with the reception means 32 by the temperature T concurrently received with the air pressure P). The body-side ECU 31 further records on the RAM the time when the reception means 32 receives the air pressure P and the temperature T, which are arithmetical elements of the calculated temperature correction pressure value, in association with the ID.

As is well known, the volume of the interior space of the tire 17 is almost constant unless the tire 17 is punctured. Furthermore, when the volume of the interior space of the tire 17 is defined as V, the value obtained by P×V/T becomes a fixed value. In other words, as the temperature T of the interior space of the tire 17 rises, the air pressure P increases. As the temperature T falls, the air pressure P decreases. More specifically, when the volume V is constant, the magnitude of the air pressure P varies with the magnitude of the temperature T. Therefore, when the body-side ECU 31 calculates a plurality of temperature correction pressure values (=P/T) based on the air pressure P and the temperature T each detected at a plurality of time points, the plurality of temperature correction pressure values become the values corresponding to the plurality of air pressures each measured at the same temperature (i.e., without the influence of temperature). In other words, the temperature correction pressure values (=P/T) are the values corresponding to the mole number of the components (for example, nitrogen and oxygen) constituting the air in the tire 17.

The body-side ECU 31 further functionally includes a reception number-of-times counter that counts how many times the reception means 32 received the wireless information from the transmission means 24 after the electric power of the in-vehicle battery is supplied to the body-side ECU 31, the pneumatic sensor 22, and the display means 33 by operation of an ignition key. When the number of times of the reception of the reception means 32 becomes two or more, the body-side ECU 31 calculates an estimated temperature correction pressure value R using the latest two temperature correction pressure values (=P/T) as viewed from current time. The estimated temperature correction pressure value R is calculated using the following Expression (1):

$$R=(R2-R1)/(t2-t1)\times(t-t2)+R2 \quad (1)$$

where t1 represents older time out of two times when the reception means received the air pressures (and temperatures) which are arithmetical elements of the latest two temperature correction pressure values as viewed from current time, and t2 represents later time out of the two times when the reception means received the air pressures (and temperatures) which are arithmetical elements of the latest two temperature correction pressure values as viewed from current time, t represents current time, R1 represents the temperature correction pressure value at time t1, and R2 represents the temperature correction pressure value at time t2.

Figure 3:
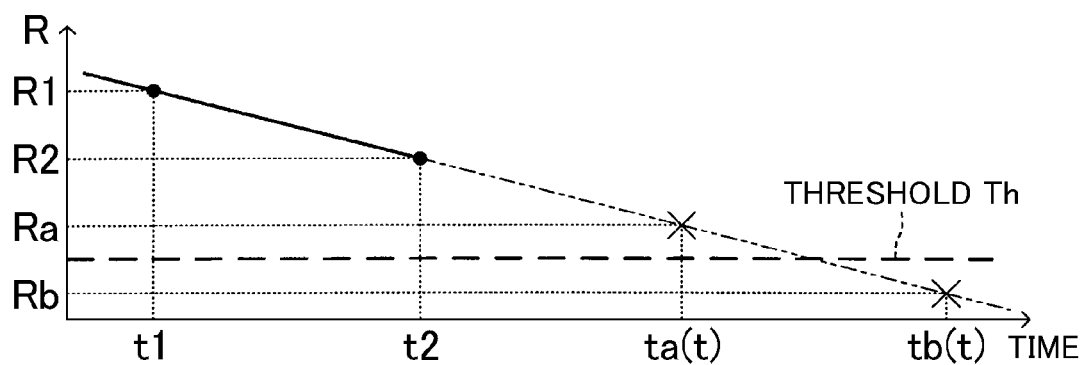
FIG. 3 is a graph view for describing the calculation principle of an estimated temperature correction pressure value and an estimated air pressure.

FIG. 3 is a graph view for describing the principle of the estimated temperature correction pressure value. As is clear from the graph view, the estimated temperature correction pressure value R calculated by Expression (1) is an estimated value of the temperature correction pressure value at current time t that is later than time t2. In other words, the estimated temperature correction pressure value R is an estimated value of the temperature correction pressure value at current time t that is estimated at current time t. That is, the estimated temperature correction pressure value R is a value linearly predicted on the assumption that a change amount of the temperature correction pressure value per unit time is constant. Here, when the current time t is assumed to be equal to time ta in FIG. 3, the estimated temperature correction pressure value R is equal to an estimated temperature correction pressure value Ra. When the current time t is assumed to be equal to time tb in FIG. 3, the estimated temperature correction pressure value R is equal to an estimated temperature correction pressure value Rb.

The body-side ECU 31 further calculates an estimated air pressure Pt based on the calculated estimated temperature correction pressure value R and based on Tt and Expression (2) described below:

$$Pt=\text{estimated temperature correction pressure value } R \times Tt \quad (2)$$

where, Tt represents the temperature inside the tire 17 received by the reception means 32, the temperature being the latest temperature based on current time t. The estimated air pressure Pt is an estimated value of the air pressure P of the tire 17 at current time t, the estimate value being re-corrected using the temperature Tt.

For example, when the current time t is time ta or tb, and the reception means 32 has not received any wireless information from the transmission means 24 during a period of time from time t2 to time ta or tb, the temperature Tt is equal to the temperature T received by the reception means 32 at time t2. Using Expression (2) enables the body-side ECU 31 to speculate immediately after the lapse of time ta that the estimated air pressure Pt becomes larger than the threshold Th at time ta with adequate accuracy. The body-side ECU 31 can further speculate immediately after the lapse of time tb that the estimated air pressure Pt becomes equal to or less than the threshold Th at time tb with adequate accuracy. Therefore, even if the reception means 32 becomes unable to receive the wireless information transmitted from the transmission means 24 during a period of time (for example, about 5 minutes) from time t2 to a given time after time tb, the body-side ECU 31 can estimate immediately after time tb that the air pressure P of any one of the tires 17 becomes equal to or less than the threshold Th at time tb. When the body-side ECU 31 makes such an estimate, the actual air pressure P may become equal to or less than the threshold Th at the time later than time tb. In this case, the body-side ECU 31 ends up estimating that the air pressure P becomes equal to or less than the threshold in advance.

When determining, for example, that the estimated air pressure Pt of the tire 17 becomes equal to or less than the threshold Th at current time t (time tb), the body-side ECU 31 performs warning display in a display area on the display means 33 over predetermined time, the display area corresponding to the wheel equipped with the pertinent tire 17.

The number of times that the body-side ECU 31 calculates Expressions (1), (2) is determined by the number of times that the reception means 32 receives the information. More specifically, when the reception means 32 receives the wireless information from the same transmission means 24 n times (provided that n is an integer equal to or more than two), the body-side ECU 31 calculates Expressions (1), (2) n−1 times.

The body-side ECU 31 can also theoretically calculate the estimated temperature correction pressure value R using latest three or more temperature correction pressure values as viewed from current time t and based on an expression different from Expression (1). However, as the number of the temperature correction pressure values used for calculation increases, the calculation start time of the estimated temperature correction pressure value R by the body-side ECU 31 becomes later. As in the present embodiment, when the body-side ECU 31 calculates the estimated temperature correction pressure value R based on the latest two temperature correction pressure values as viewed from current time, the calculation start time of the estimated temperature correction pressure value R by the body-side ECU 31 is moved up. Therefore, even when the transmission means 24 and the reception means 32 are unable to demonstrate expected communication performance, the vehicle tire pressure detector of the present embodiment can inform the occupant of a decrease in the air pressure P of the tire 17 immediately after the decrease in the air pressure P of the tire 17 or in advance.

The vehicle tire pressure detector can further inform the decrease in the air pressure P irrespective of the length of the operation intervals of the pneumatic sensor 22, the temperature sensor 23, and the transmission means 24. As a result, it becomes possible to eliminate the necessity of shortening the operation intervals of the pneumatic sensor 22, the temperature sensor 23, and the transmission means 24. Therefore, it becomes possible to reduce power consumption of the pneumatic sensor 22, the temperature sensor 23, and the transmission means 24. This also makes it possible to eliminate the necessary of frequent replacement of the battery 25.

However, when the actually measured air pressure P of the tire 17 is equal to or less than the threshold Th, the body-side ECU 31 does not need to calculate the estimated temperature correction pressure value R for the tire 17. Accordingly, the body-side ECU 31 does not calculate Expressions (1), (2) for the tire 17, while the display means 33 performs warning display based on the air pressure P and the threshold Th of the tire 17.

Figure 4:
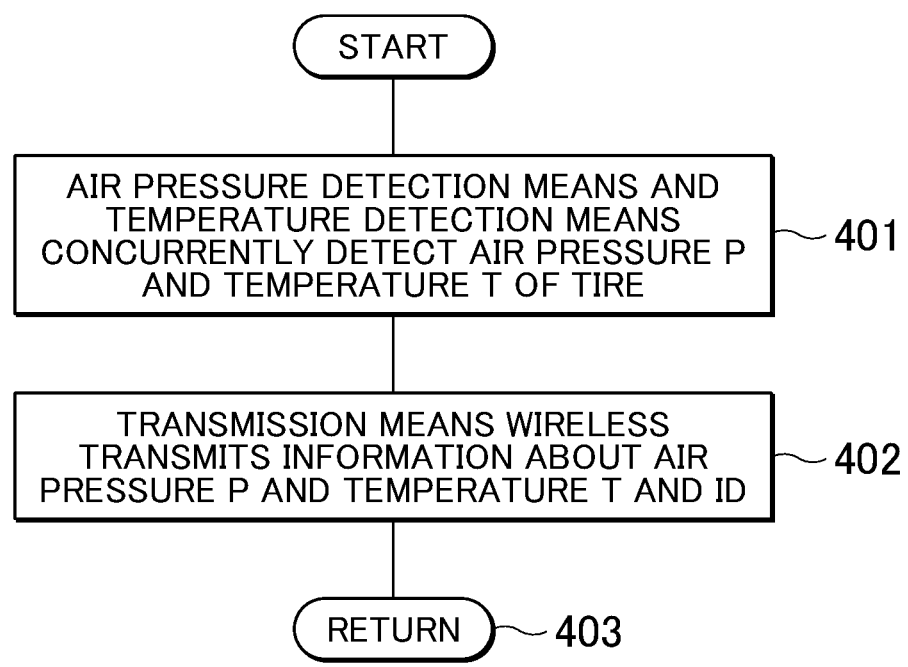
FIG. 4 is a flowchart illustrating processing executed by a measurement unit.
Figure 5:
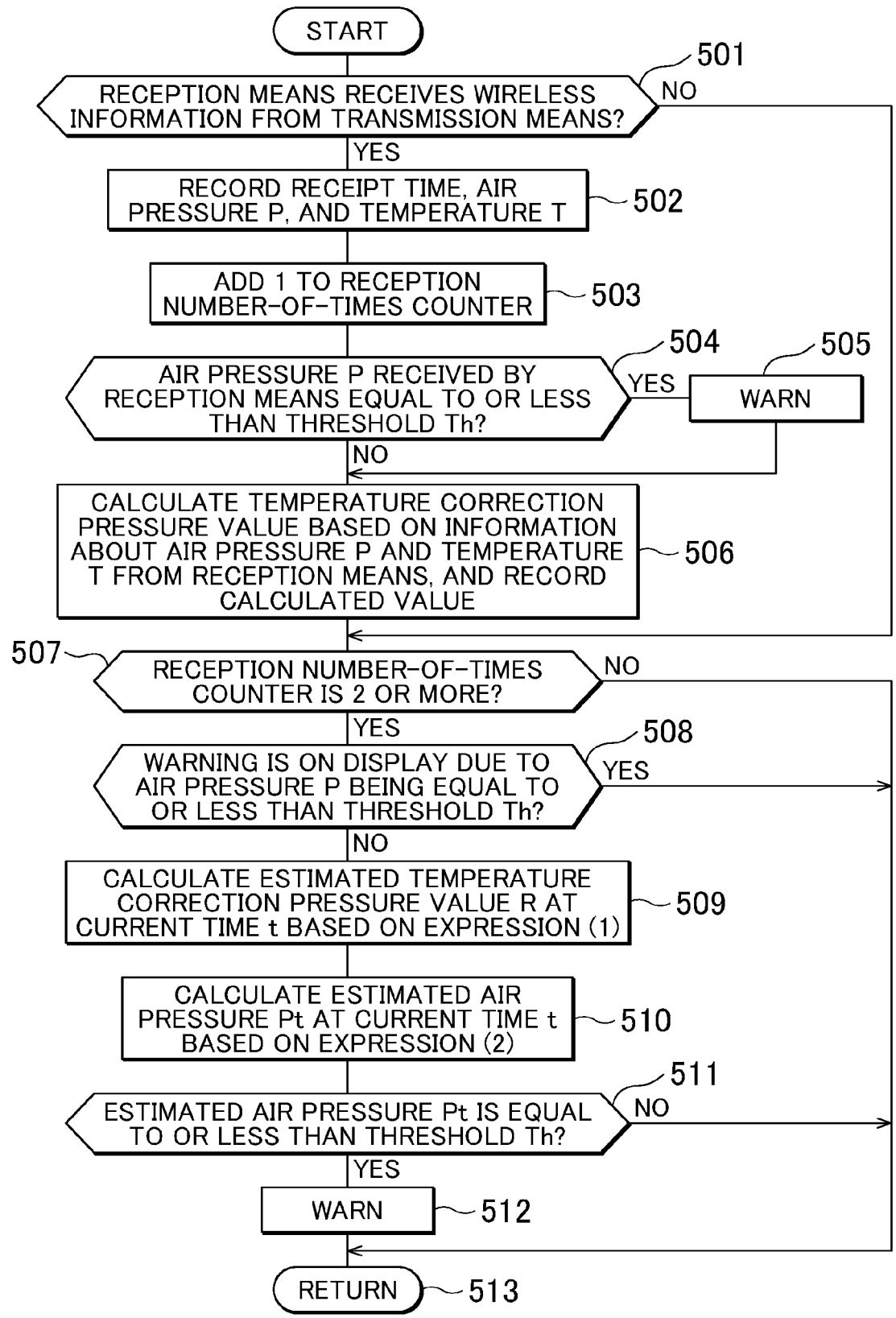
FIG. 5 is a flowchart illustrating processing executed by a warning determination unit.

A description is now given of the processing performed by the measurement unit 20 and the warning determination unit 30 with reference to the flowcharts in FIGS. 4 and 5.

When the electric power of the battery 25 is supplied to the tire-side ECU 21, the tire-side ECU 21 of each measurement unit 20 provided in each of the front wheels 15FL, 15FR and the rear wheels 15RL, 15RR repeatedly executes a routine illustrated in the flowchart of FIG. 4 whenever a definite time ts (for example, 1 minute) elapses.

First in step 401, each tire-side ECU 21 concurrently operates the pneumatic sensor 22 and the temperature sensor 23 of the tire 17 equipped with the tire-side ECU 21. That is, the tire-side ECU 21 makes the pneumatic sensor 22 and the temperature sensor 23 concurrently detect the air pressure P and the temperature T of the interior space of the tire 17, respectively. The pneumatic sensor 22 and the temperature sensor 23, which detected the air pressure P and the temperature T respectively, transmit the detected air pressure P and the detected temperature T to the transmission means 24 under the control of the tire-side ECU 21, respectively.

Next, in step 402, the tire-side ECU 21 concurrently and wirelessly transmits the information about the air pressure P and the temperature T that the transmission means 24 concurrently acquired from the pneumatic sensor 22 and the temperature sensor 23 as well as the ID of the transmission means 24 as one set to the reception means 32.

The tire-side ECU 21 that finished the processing of step 402 proceeds to step 403 and temporarily ends the present routine.

When the electric power of the in-vehicle battery of the vehicle 10 is supplied to the body-side ECU 31, the reception means 32, and the display means 33 by operation of the ignition key which is not illustrated, the body-side ECU 31 repeatedly executes a routine illustrated in the flowchart of FIG. 5 whenever a definite time ts elapses. The flowchart of FIG. 5 illustrates the processing based on the information about the air pressure P and the temperature T of the tire 17 of the front wheel 15FL that is one of the wheels, the information being transmitted from the transmission means 24 of the measurement unit 20 of the front wheel 15FL. The body-side ECU 31 further performs the same processing as FIG. 5 based on the information about the air pressure P and the temperature T of each tire 17 transmitted from the transmission means 24 of each measurement unit 20 of the front wheel 15FR, the rear wheel 15RL, and the rear wheel 15RR, simultaneously with the processing relating to the front wheel 15FL.

First in step 501, the body-side ECU 31 determines whether or not the reception means 32 received the information about the air pressure P and the temperature T of the interior space of the tire 17 of the front wheel 15FL and the ID of the transmission means 24, the information being wirelessly transmitted from the transmission means 24 of the measurement unit 20 of the front wheel 15FL. When the reception means 32 received the ID and the information about the air pressure P and the temperature T, the reception means 32 transmits the information and the ID to the body-side ECU 31 as one set.

When Yes is determined in step 501, the body-side ECU 31 proceeds to step 502 to record on a storage region corresponding to each wheel (ID) in the own RAM the information about the receipt time of the reception means 32 and the received information about the air pressure P and the temperature T. When No is determined in step 501, the body-side ECU 31 proceeds to step 507 described later.

Next, the body-side ECU 31 proceeds to step 503 to add "1" to the reception number-of-times counter. The reception number-of-times counter is set to "0" at the time (hereinafter referred to as start time) when the electric power of the in-vehicle battery is supplied to the body-side ECU 31 by operation of the ignition key.

Next, the body-side ECU 31 proceeds to step 504 to determine whether or not the air pressure P received by the reception means 32 in step 501 is equal to or less than the threshold Th.

When Yes is determined in step 504, the body-side ECU 31 proceeds to step 505 to perform warning display in a region corresponding to the ID (received by the reception means 32) of the display means 33 over predetermined time.

When No is determined in step 504, or when the processing of step 505 is finished, the body-side ECU 31 proceeds to step 506. Then, the body-side ECU 31 calculates a temperature correction pressure value (=P/T) based on the information about the air pressure P and the temperature T received from the reception means 32. The body-side ECU 31 further records on a storage region corresponding to each wheel (ID) in the RAM the calculated temperature correction pressure value (=P/T) in association with the time when the reception means 32 received the air pressure P and the temperature T which are arithmetical elements of the temperature correction pressure value.

The body-side ECU 31 which finished the processing of step 506 proceeds to step 507 to determine whether or not the reception number-of-times counter is equal to or more than "2." That is, it is determined whether or not the reception means 32 has already received from the transmission means 24 the information about the air pressure P and the temperature T of the tire 17 of the front wheel 15FL twice or more after the start time.

When No is determined in step 507, the body-side ECU 31 proceeds to step 513 and temporarily ends the present routine.

When Yes is determined in step 507, the body-side ECU 31 proceeds to step 508. The body-side ECU 31 then determines whether or not the display means 33 executes warning display at current time due to the air pressure P received by the reception means 32 being determined to be equal to or less than the threshold Th in step 504.

When Yes is determined in step 508, the body-side ECU 31 does not need to calculate the estimated temperature correction pressure value R for the tire 17. Accordingly, in this case, the body-side ECU 31 proceeds to step 513, and temporarily ends the present routine.

Meanwhile, when No is determined in step 508, the body-side ECU 31 proceeds to step 509 to calculate the estimated temperature correction pressure value R at current time t based on Expression (1). More specifically, the body-side ECU 31 applies two times t1, t2 when the reception means 32 received the air pressures (and temperatures) that are arithmetical elements of the latest two temperature correction pressure values as viewed from current time t, and the temperature correction pressure values R1 and R2 at times t1, t2 to Expression (1) to calculate the estimated temperature correction pressure value R.

The body-side ECU 31 that finished the processing of step 509 proceeds to step 510 to estimate the air pressure Pt at current time t using the temperature Tt of the tire 17, the estimated temperature correction pressure value R, and Expression (2), the temperature Tt being received by the reception means 33 and being latest based on current time t (i.e., the temperature detected at the later time t2 out of the time t1 and the time t2). For example, when the temperature T, which was received by the reception means 32 from the transmission means 24 in step 501 of the previous routine processing, is the latest temperature information, the body-side ECU 31 uses the temperature Tt to calculate the estimated air pressure Pt.

The body-side ECU 31 that finished the processing of step 510 proceeds to step 511 to determine whether or not the estimated air pressure Pt is equal to or less than the threshold Th.

When Yes is determined in step 511, the body-side ECU 31 proceeds to step 512 to perform display warning in the region corresponding to the ID of the display means 33 over predetermined time. The body-side ECU 31 then proceeds to step 513, and temporarily ends the present routine.

When No is determined in step 511, the body-side ECU 31 proceeds to step 513 and temporarily ends the present routine.

Figure 6:
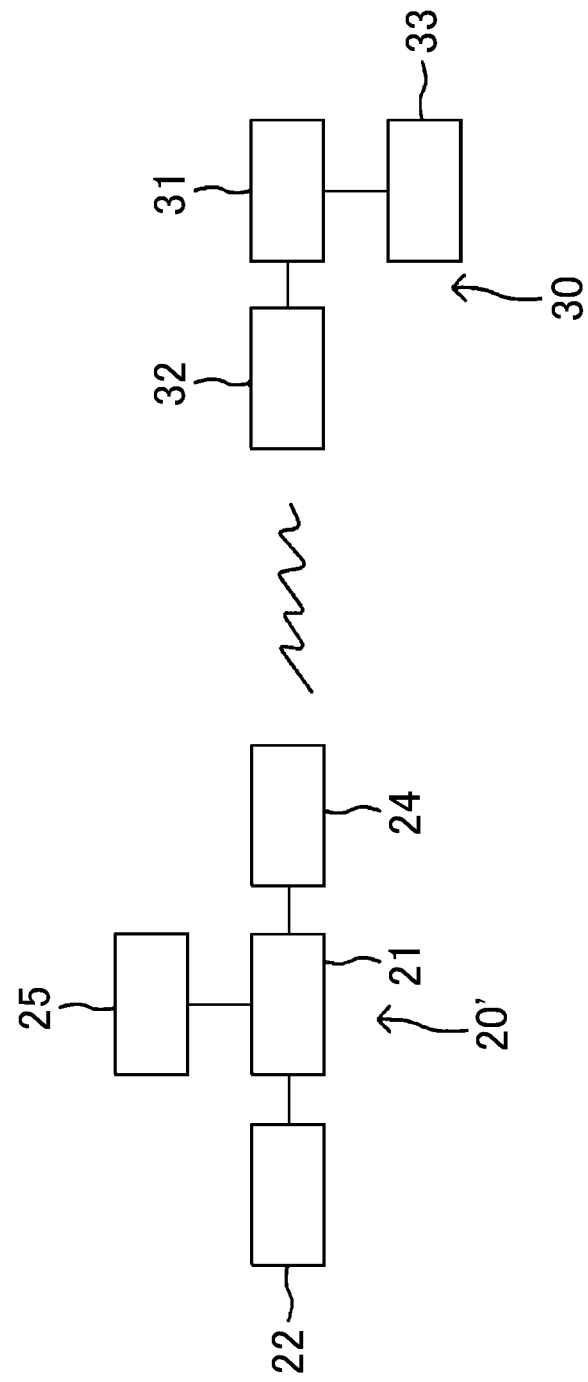
FIG. 6 is a block diagram corresponding to FIG. 2 of a second embodiment of the present disclosure.
Figure 7:
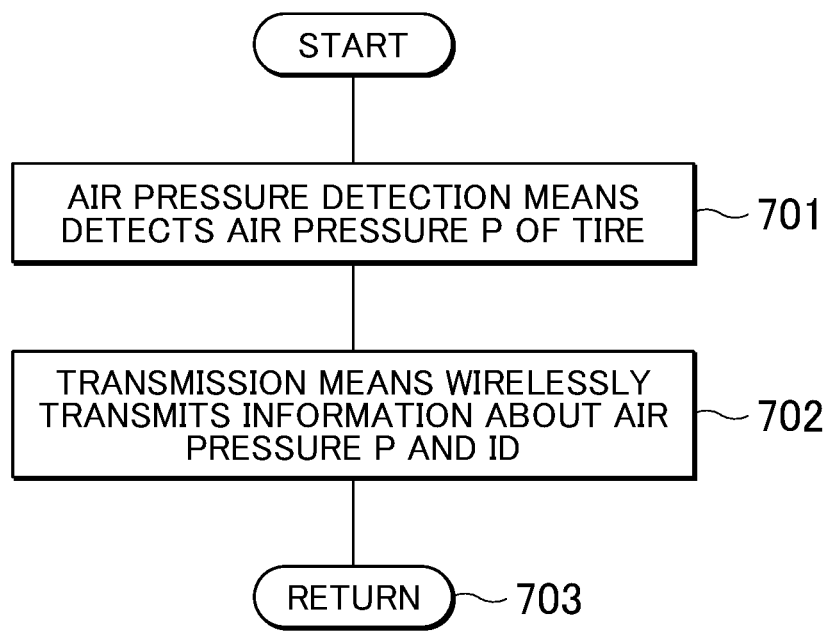
FIG. 7 is a flowchart corresponding to FIG. 4.
Figure 8:
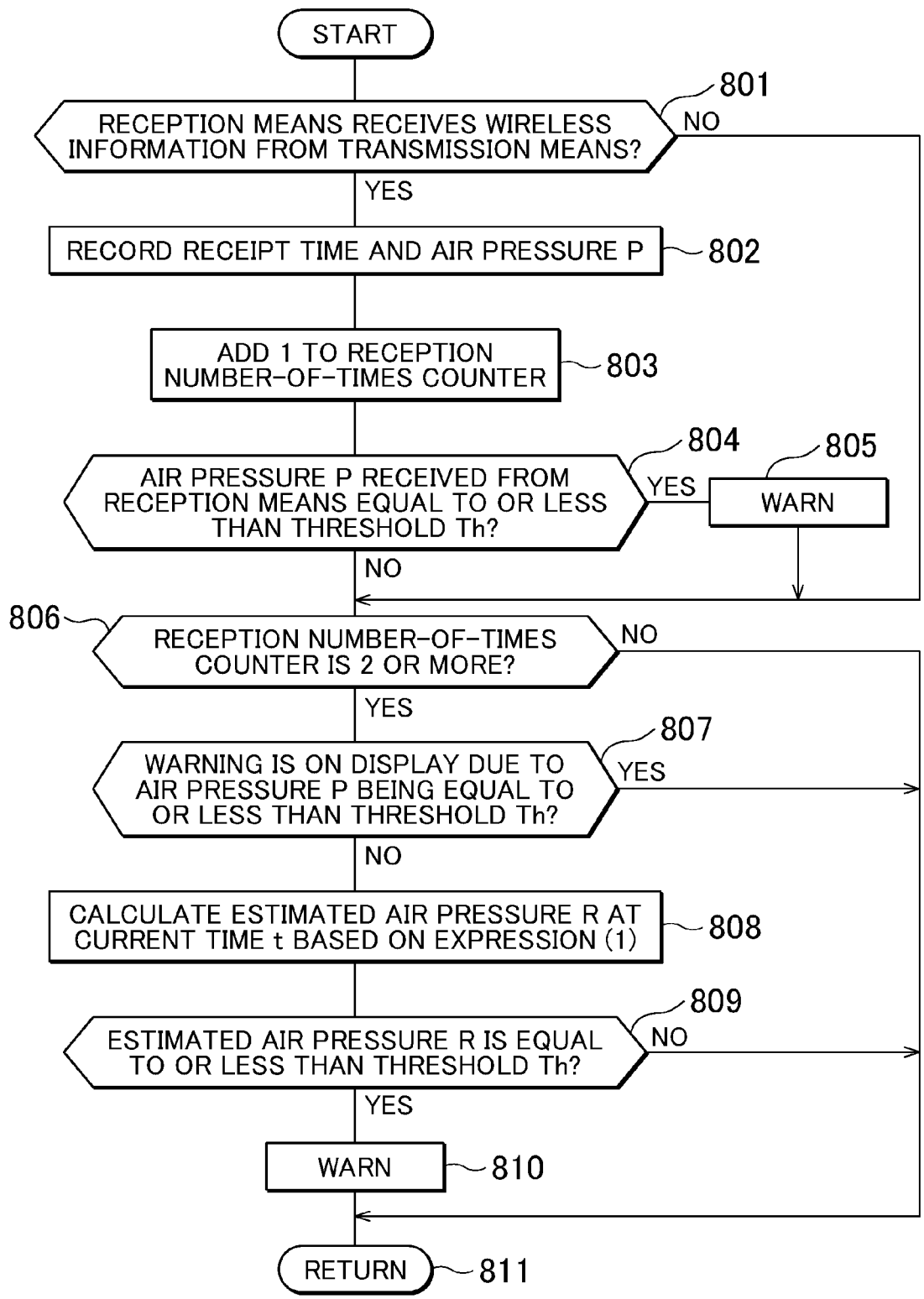
FIG. 8 is a flowchart corresponding to FIG. 5.

A description is now given of the second embodiment of the present disclosure with reference to FIGS. 6 through 8. The component members similar to those in the first embodiment are designated by similar reference signs and the detailed description thereof is omitted.

As illustrated in FIG. 6, a measurement unit 20' of the vehicle 10 in the present embodiment includes the tire-side ECU 21, the pneumatic sensor 22, the transmission means 24, and the battery 25. In other words, the measurement unit 20' does not include the temperature sensor 23.

The body-side ECU 31 of the present embodiment performs calculation described below based on Expression (1) described above, when the number of times of reception of the reception means 32 become twice or more. If t1, t2, R1, and R2 described below are applied to Expression (1), the body-side ECU 31 can calculate the estimated air pressure R at current time t:

$$R=(R2-R1)/(t2-t1)\times(t-t2)+R2 \qquad (1)$$

where t1 represents the older time out of two times when the reception means individually received the latest two air pressures P as viewed from current time, t2 represents the later time out of the two times at which the reception means individually received the latest two air pressures P as viewed from current time, t represents current time, R1 represents the air pressure P of the tire received by the reception means at time t1, and R2 represents the air pressure P of the tire received by the reception means at time t2.

In this case, the body-side ECU 31 compares the estimated air pressure R calculated based on Expression (1) with a threshold Th. When the estimated air pressure R becomes equal to or less than the threshold Th, the display means 33 is made to perform warning display. More specifically, the body-side ECU 31 can determine whether or not the air pressure P of the tire is equal to or less than the threshold Th at current time t without using the temperature T of the tire 17.

However, in the case where, for example, an interval between time t1 and time t2 is long, or the tire 17 is dipped into a puddle between time t1 and time t2, a large difference may be generated between the temperature T of the tire 17 at time t1 and the temperature T at time t2. In other words, the air pressure P measured with the pneumatic sensor 22 at time t1 and the air pressure P measured with the pneumatic sensor 22 at time t2 are detection values measured under the tire temperature conditions different from each other. Accordingly, the estimated air pressure R is a calculation value lower in reliability than the estimated air pressure Pt. In other words, the possibility that an actual air pressure P of the tire 17 becomes equal to or less than the threshold Th at current time t in the case where the estimated air pressure R becomes equal to or less than the threshold Th is lower than the possibility that the actual air pressure P becomes equal to or less than the threshold Th at current time t in the case where the estimated air pressure Pt becomes equal to or less than the threshold Th. However, when there is almost no temperature difference between the temperature T of the tire 17 at time t1 and the temperature T at time t2, the determination result using the estimated air pressure R and the threshold Th has an adequately high reliability.

A description is now given of the processing performed by the measurement unit 20' and the warning determination unit 30 with reference to the flowcharts in FIGS. 7 and 8. The tire-side ECU 21 repeatedly executes a routine illustrated in the flowchart of FIG. 7, whenever a definite period of time ts (for example, 1 minute) elapses.

When the electric power of the battery 25 is supplied to the tire-side ECU 21, each tire-side ECU 21 operates the pneumatic sensor 22 of the tire 17 equipped with the tire-side ECU 21 in step 701. The pneumatic sensor 22 that detected the air pressure P transmits the detected air pressure P to the transmission means 24 under the control of the tire-side ECU 21.

Next, in step 702, the tire-side ECU 21 wirelessly transmits to the reception means 32 the information about the air pressure P and an ID of the transmission means 24 as a pair, the air pressure P being acquired from the pneumatic sensor 22 by the transmission means 24.

The tire-side ECU 21 that finished the processing of step 702 proceeds to step 703 and temporarily ends the present routine.

Furthermore, when the electric power of the in-vehicle battery is supplied to the body-side ECU 31, the reception means 32, and the display means 33, the body-side ECU 31 repeatedly executes a routine illustrated in the flowchart of FIG. 8 whenever a definite time ts elapses.

Steps 801, 802, 803, 804, 805, 806, and 807 are processings corresponding to steps 501, 502, 503, 504, 505, 507, and 508 of the first embodiment, respectively. However, in step 801, the reception means 32 receives only the air pressure P and the ID. In step 802, the body-side ECU 31 records only the air pressure P on a storage region corresponding to each wheel (ID) in the RAM.

When No is determined in step 807, the body-side ECU 31 proceeds to step 808 to calculate the estimated air pressure R at current time t based on Expression (1). More specifically, the body-side ECU 31 applies two times t1, t2 when the reception means individually received the latest two air pressures P, and air pressures R1, R2 at time t1, t2 to the expression (1) to calculate an estimated air pressure R at current time.

The body-side ECU 31 that finished the processing of step 808 proceeds to step 809 to determine whether or not the estimated air pressure R is equal to or less than the threshold Th.

When Yes is determined in step 809, the body-side ECU 31 proceeds to step 810 to perform warning display in the region corresponding to the ID of the display means 33 over predetermined time. The body-side ECU 31 then proceeds to step 811, and temporarily ends the present routine.

When No is determined in step 809, the body-side ECU 31 proceeds to step 811 and temporarily ends the present routine.

The present disclosure is not limited to each of the embodiments disclosed, and various modified examples can be adopted within the range of the present disclosure. For example, the body-side ECU 31 may calculate the estimated temperature correction pressure value R or the estimated air pressure R using three or more latest temperature correction pressure values (=P/T) or air pressures P as viewed from current time t, when the number of times of reception of the reception means 32 becomes three or more. In this case, the body-side ECU 31 calculates the estimated temperature correction pressure value R or the estimated air pressure R using an expression different from Expression (1). For example, the body-side ECU 31 uses the method of least squares to obtain an approximate expression (function) from the three or more latest temperature correction pressure values or air pressures P. The body-side ECU 31 then calculates the estimated temperature correction pressure value R or the estimated air pressure R at current time t (ta, tb) using the obtained approximate expression.

Furthermore, the body-side ECU 31 of the first embodiment may compare the estimated temperature correction pressure value R at current time t calculated with Expression (1) with a threshold Th', instead of re-correcting the estimated temperature correction pressure value R with Tt. In this case, the body-side ECU 31 makes the display means 33 perform warning display when the estimated temperature correction pressure value R is equal to or less than the threshold Th'. The determination precision according to the modified example is highly likely to be lower than that of the first embodiment. However, when there is almost no difference between the temperature T at current time t and the temperature Tt, the determination result in the present modification is comparable in reliability to the first embodiment.

Times below may be used as times t1, t2 of the first embodiment. The times include: older time t1 out of two times when latest two temperature correction pressure values are individually calculated as viewed from current time; and later time t2 out of the two times when the latest two temperature correction pressure values are individually calculated as viewed from current time.

The measurement unit 20 may be provided in not all the front wheels 15FL, 15FR and the rear wheels 15RL, 15RR, but only in some of the wheels.

The vehicle 10 may be equipped with a speaker (alarm generation means) that raises an alarm when the body-side ECU 31 determines that the estimated air pressure Pt, the estimated air pressure R, or the estimated temperature correction pressure value R becomes equal to or less than the threshold Th (threshold Th').

The vehicle to which the present disclosure is applied may be other than a four-wheeled vehicle. For example, the measurement unit 20 may be provided in at least one of a front wheel and a rear wheel of a two wheeler, and the warning determination unit 30 may be provided in the body of the two wheeler. Moreover, the measurement unit 20 may be provided in a spare tire mounted on the four-wheeled vehicle. In addition to the air pressure (and temperature) of the four wheels 15FL, 15FR, 15RL, 15RR, the tire pressure (and temperature) of the spare tire may further be monitored with the measurement unit 20.

What is claimed is:

1. A tire pressure detector, comprising: an air pressure detector provided in a target tire, the air pressure detector being configured to repeatedly detect air pressure of the target tire; a transmission device provided in the target tire, the transmission device being configured to wirelessly transmit air pressure information about the air pressure detected by the air pressure detector; a reception device provided in a vehicle body, the reception device being configured to receive the air pressure information transmitted by the transmission device; an estimation device provided in the vehicle body, the estimation device being configured to calculate, when the reception device receives the air pressure information on the target tire a plurality of times, an estimated air pressure based on a plurality of pieces of latest air pressure information received by the reception device, the estimated air pressure being an estimated value of the air pressure at current time; and an alarm generation device provided in the vehicle body, the alarm generation device being configured to raise an alarm when the estimated air pressure becomes equal to or less than a specified threshold, wherein the estimation device is configured to calculate R that is the estimated air pressure at current time t based on Expression below: $R=\{(R2-R1)/(t2-t1)\}\times(t-t2)+R2$, where t1, t2 represent in chronological order respective times when the reception device received latest two pieces of the air pressure information, t represents the current time, R1 represents the air pressure at time t1, and R2 represents the air pressure at time t2.

2. A tire pressure detector, comprising: an air pressure detector provided in a target tire, the air pressure detector being configured to repeatedly detect air pressure of the target tire; a temperature detector provided in the target tire, the temperature detector being configured to repeatedly detect temperature of air inside the target tire with timing identical to timing of detection of the air pressure by the air pressure detector; a transmission device provided in the target tire, the transmission device being configured to wirelessly transmit air pressure information about the air pressure and temperature information about the temperature that are detected with identical timing by the air pressure detector and the temperature detector; a reception device provided in a vehicle body, the reception device being configured to receive the air pressure information and the temperature information transmitted by the transmission device; an arithmetic device provided in the vehicle body, the arithmetic device being configured to calculate a temperature correction pressure value obtained by dividing an air pressure value by a temperature value, the air pressure value being recorded on the air pressure information received by the reception device, the temperature value being recorded on the temperature information received by the reception device with timing identical to reception timing of the air pressure information; an estimation device provided in the vehicle body, the estimation device being configured to calculate, when the reception device receives the air pressure information and the temperature information on the target tire from the transmission device a plurality of times, an estimated temperature correction pressure value based on the plurality of pieces of latest temperature correction pressure value, the estimated temperature correction pressure value being an estimated value of the temperature correction pressure value at current time; and an alarm generation device provided in the vehicle body, the alarm generation device being configured to raise an alarm when the estimated temperature correction pressure value becomes equal to or less than a specified first threshold, or when a value becomes equal to or less than a specified second threshold, the value being obtained by multiplying the estimated temperature correction pressure value by a temperature value recorded on the temperature information that is received by the reception device and is latest based on current time.

3. The tire pressure detector, according to claim 2, wherein the estimation device is configured to calculate R that is the estimated temperature correction pressure value at current time t based on Expression below:

$$R=\{(R2-R1)/(t2-t1)\}\times(t-t2)+R2$$

where t1, t2 represent in chronological order respective times when the latest two temperature correction pressure values were calculated, t represents the current time, R1 represents the temperature correction pressure value at time t1, and R2 represents the temperature correction pressure value at time t2.

* * * * *